July 20, 1937.  C. MORTENSON  2,087,259
CONTAINER FOR CUT FLOWERS AND THE LIKE
Filed May 16, 1935  2 Sheets-Sheet 1
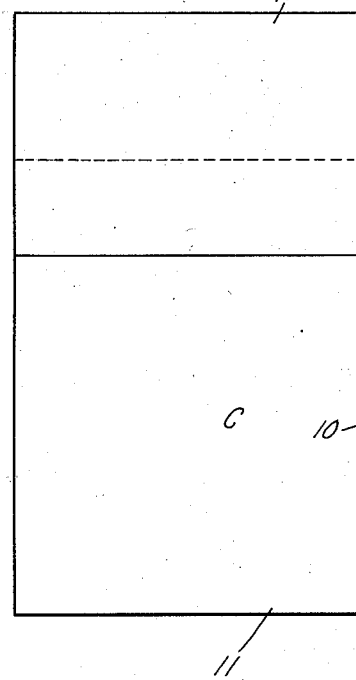
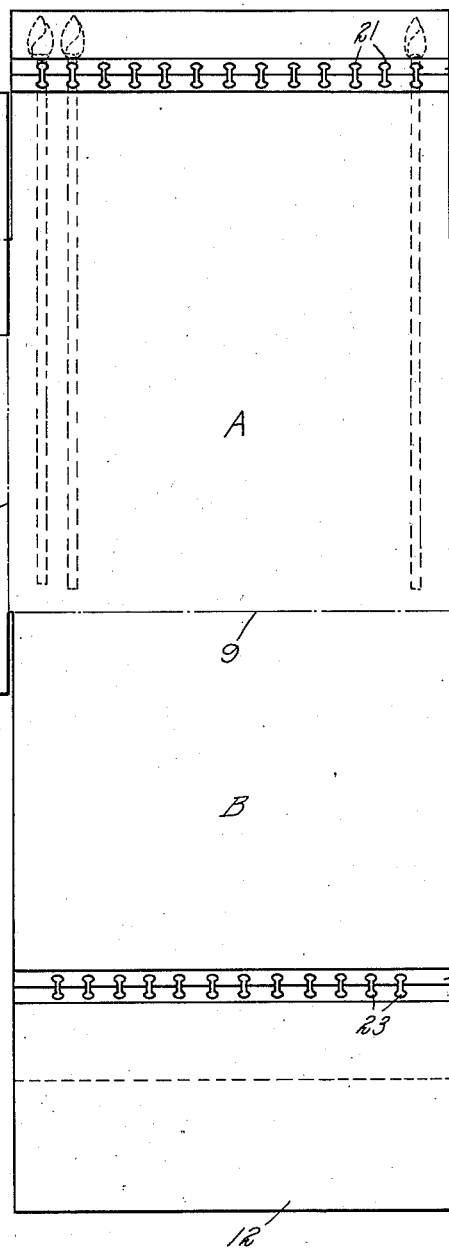
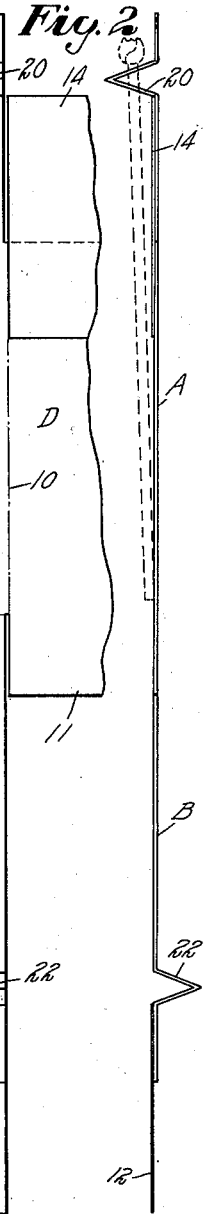
Inventor
Clemens Mortenson
By W. Clay Lindsey
Attorney July 20, 1937.   C. MORTENSON   2,087,259
CONTAINER FOR CUT FLOWERS AND THE LIKE
Filed May 16, 1935   2 Sheets-Sheet 2
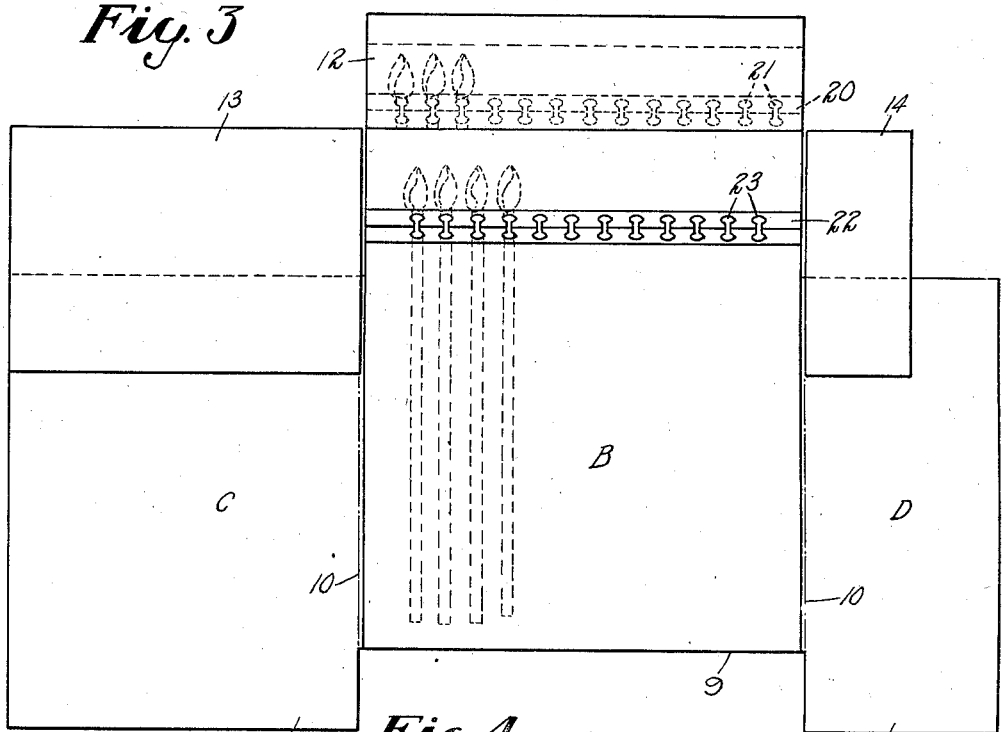
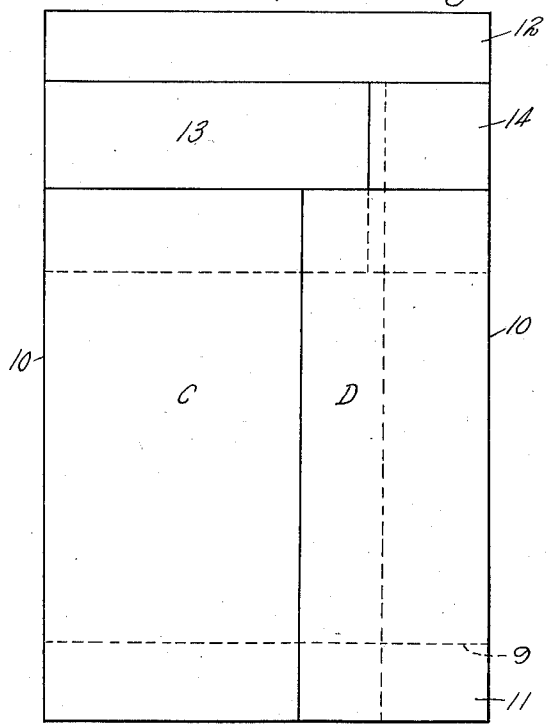
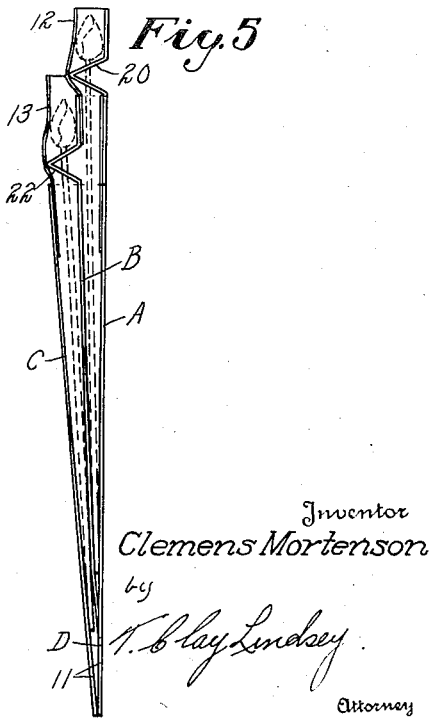
Inventor
Clemens Mortenson
by
T. Clay Lindsey.
Attorney Patented July 20, 1937

2,087,259

UNITED STATES PATENT OFFICE 2,087,259

CONTAINER FOR CUT FLOWERS AND THE LIKE

Clemens Mortenson, Cromwell, Conn., assignor of one-half to Edwin E. Sage

Application May 16, 1935, Serial No. 21,701

8 Claims. (Cl. 206—79)

This invention relates to containers or packages for use in shipping cut flowers and the like.

It is the usual practice in preparing cut flowers for shipment to the market to pick the flowers and then cut the stems to lengths depending upon the size and condition of the blooms. The flowers of the most desirable size and in the best of condition are left with long stems, and these are sold as of the first grade. The flowers of smaller sizes and those not in prime condition have their stems cut to lesser lengths. The flowers are then sorted into different groups according to the lengths of their stems, and the graded flowers are tied into bunches of twenty-five and placed in water until they are to be shipped. To ship the same, the several bunches of flowers of the same grade are successively untied, and the flowers laid in superimposed layers of twenty-five, for example, in the shipping box, there being placed between adjacent layers a piece of water-proofed paper. The shipping boxes are shipped to market where the commission men or dealers examine the flowers and bid for them according to their size and condition. The manner of packing the flowers as heretofore practiced is objectionable for many reasons. The flowers are handled quite a few times, and in spite of the care which may be taken it is quite likely that some of the flowers will become bruised or injured. The flowers are not well protected during shipment, and they cannot be easily and readily examined by the market men without likelihood of further injury.

The aim of the present invention is to provide an improved package or container, the use of which will reduce the number of times that the flowers need to be handled in preparing them for the market, and which will permit of ready examination of the flowers by the commission men without taking the flowers from the shipping box, thus materially reducing the extent to which the flowers are likely to be bruised or injured, and, therefore, insuring that a better price be obtained. My improved container is such that the flowers, after they have been sorted or graded, may be placed directly into the container without the necessity of first tying the flowers into bunches and then untying the bunches. The flowers are effectively protected during shipment, and they may be examined by the market men with little trouble and with small likelihood of injury to the flowers.

A further aim of the invention is to provide a container of this character which is characterized by its extreme simplicity in construction, by the economy with which it may be manufactured, by the ease and facility with which the flowers may be arranged and secured therein, and by its effectiveness in use.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings wherein I have shown, for illustrative purposes, one embodiment which the present invention may take:

Figure 1 is a view showing the container laid out flat with one section ready to receive flowers.

Fig. 2 is an edge view of the container as shown in Fig. 1.

Fig. 3 is a view similar to Fig. 1 but showing one flower supporting section folded over the section which supports the first layer of flowers.

Fig. 4 is a view showing the container completely folded up into final form ready to be placed in a shipping box, and Fig. 5 is a view looking at the right-hand edge of the folded container but with the flap D not folded over the section B, the thickness of the paper being somewhat exaggerated, several portions being somewhat more separated than in practice in order that the disclosure will be somewhat clearer.

Referring to the drawings in detail, my improved container may be formed of relatively heavy paper or similar material which has been water-proofed. If desired, the container may comprise a blank, as shown in the drawings. It has a first flower carrying section or portion A and a second flower carrying section B connected to one edge of the first section (in the present instance, to the bottom edge) and adapted to be folded over that section along the crease or fold line 9. At the side edges of the section A are flaps C and D which are adapted to be folded over the section B along the crease or fold lines 10 after the section B has been folded over the section A. The flaps C and D may be provided at their lower ends with wings 11 which extend beyond the lower edge of the section A. By preference, there is secured to the normally upper edge of the section B a strip or piece 12 of paper which is relatively softer than the main blank. This strip may be of transparent or semi-transparent waxed tissue paper, Cellophane, or a similar material. There also may be secured to the upper portions of the flaps C and D similar strips 13 and 14 of waxed tissue paper.

Each of the sections A and B is provided, adjacent its normally upper edge, with means for securing and holding the flowers on these sections in parallel, spaced apart relation. More particularly, and to this end, the section A has spaced from its upper edge a transversely extending fold which forms a V-shaped rib 20. This rib is provided with spaced apart notches or openings 21 of suitable configuration and through which the stems, adjacent the blooms, are adapted to extend. In the present instance, these openings or notches 21 are shown as being of generally dumb-bell shape, the same having circular ends and restricted portions between the circular ends. The section B has a rib or fold 22 which is identical to the rib 20. The notches in the rib 22 are designated by the numeral 23. The rib 22, when the section B is folded over section A, is spaced below the rib 20, and the notches 23 are in staggered relation to the notches 21.

When it is desired to ship flowers with the use of my improved container or package, the stems of the flowers are cut to size, and the flowers are graded or sorted, as heretofore. However, instead of tying the flowers into bunches of twenty-five and then untying them again, the flowers are taken directly from the sorted groups and placed into my improved folder. As it is the custom to separate the flowers into divisions of twenty-five each, I have shown the two sections of my container as having a total of twenty-five slots, there being thirteen slots 21 and twelve slots 23. The operator, when all of these slots have been filled with flowers, will know that he has twenty-five in the package, thus eliminating the necessity of counting and the likelihood of error in such counting. In securing the flowers in the folder, the folder is laid out flat, as shown in Fig. 1, and one layer of flowers is secured to the rib 20 by inserting the stems, adjacent the blooms, through the restricted portions of the slots 21 and moving them down into the round portions of these slots. After the first layer is secured in place, the section B is folded over section A to the position shown in Fig. 2, and then the slots 23 of the rib 22 are filled with flowers. Then the flaps C and D are folded over the section B. Any suitable securing means may be employed for holding the flaps in folded over condition, no securing means being shown in the present instance as the particular type thereof is immaterial. If desired, a string may be wrapped around the folded up assembly. The filled folded up containers may be placed in a shipping box with the lower edges of the wings 11 engaging the bottom of the box and the containers inclined slightly rearwardly out of vertical.

It will be observed, particularly from Figs. 4 and 5, that when the container is folded up, the flowers of the first layer are interposed between the two sections A and B and the waxed soft sheet 12 covers and protects the blooms of the first layer. The flowers which are mounted on the section B are interposed between that section and the flaps C and D, and the waxed paper pieces 13 and 14 protect the blooms of these flowers. During handling of the filled containers and shipment thereof, the flowers are held in their spaced relation and are effectively protected against injury. The flowers of any one package may be readily and easily inspected without disturbing or disarranging the flowers in any other package.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A container for cut flowers and the like having a flower supporting section, provided, adjacent its upper end, with a transversely extending V-shaped fold projecting outwardly from the plane of said section, said fold having spaced apart slotted openings adapted to receive and hold the stems of the flowers adjacent the blooms thereof, said container also having a flap adapted to be folded over said section and in covering relation with the flowers carried thereby.

2. A container for cut flowers and the like formed of water-proofed paper having a flower carrying section provided, adjacent its upper end, with a transversely extending V-shaped fold having notches with enlarged ends and restricted connecting portions, said notches being adapted to receive the stems of the flowers adjacent the blooms thereof, said container also having a flap adapted to be folded over said section and the flowers carried thereby.

3. A container for cut flowers and the like having a first flower supporting section and a second flower supporting section connected to one edge of the first section and adapted to be folded thereover, each of said sections having, adjacent its upper end, means for holding the flowers carried thereby in spaced apart, parallel relation, the flower holding means on said second section being parallel to but spaced below the flower holding means of the first section, said container also having a flap adapted to be folded over said second section.

4. A container for cut flowers and the like formed of water-proofed paper having a first flower supporting section and a second flower supporting section connected to one edge of the first section and adapted to be folded over the first section, each of said sections having, adjacent its normally upper end, a transversely extending fold forming a rib, said ribs being provided with transversely spaced apart openings for receiving the stems of the flowers adjacent the blooms thereof, said container further having a flap adapted to be folded over the second section after the second section has been folded over the first section.

5. A container for cut flowers and the like having a first flower supporting section and a second flower supporting section connected to one edge of the first section and adapted to be folded over the first section, each of said sections having, adjacent its normally upper edge, a transversely extending fold forming a rib, said ribs being provided with transversely spaced apart openings for receiving the stems of the flowers adjacent the blooms thereof, the rib of the second section being spaced from the first section and the openings of one rib being staggered with respect to those of the other rib, said container having means for covering said second section after the same has been folded over the first section.

6. A container for cut flowers and the like formed of water-proofed paper or the like having a first flower supporting section and a second flower supporting section connected to one edge of the first section and adapted to be folded over the first section, each of said sections having, adjacent its normally upper edge, a transversely extending fold forming a V-shaped rib, said ribs being provided with transversely spaced apart openings of dumb-bell shape for receiving the stems of the flowers adjacent the blooms thereof, the rib of the second section being spaced from the first section and the openings of one rib being staggered with respect to those of the other rib, said container having a flap adapted to be folded over said second section after the second section is folded over the first section.

7. A container for cut flowers and the like having a first section and a second section connected to the lower edge of the first section and adapted to be folded over the first section, each of said sections having, adjacent its normally upper edge, a transverse fold forming a V-shaped rib, each of said ribs having transversely spaced apart openings provided with rounded ends and intermediate restricted portions, said ribs being spaced from one another and the openings of one rib being in staggered relation with respect to those of the other rib, said container having at each side edge of said first section flaps adapted to be folded over the second section after the second section has been folded over the first section.

8. A container for cut flowers and the like having a first section and a second section connected to the lower edge of the first section and adapted to be folded over the first section, each of said sections having, adjacent its normally upper edge, a transverse fold forming a V-shaped rib, each of said ribs having transversely spaced apart openings provided with rounded ends and intermediate restricted portions, said ribs being spaced from one another and the openings of one rib being in staggered relation with respect to those of the other rib, said container having at each side edge of said first section flaps adapted to be folded over the second section after the second section has been folded over the first section, said second section having, at its normally upper edge, a piece of transparent material adapted to cover the blooms carried by the first section, and said flaps having, at their upper edges, pieces of transparent material covering the blooms carried by the second section.

CLEMENS MORTENSON.